(12) United States Patent
Lee et al.

(10) Patent No.: US 11,163,211 B2
(45) Date of Patent: Nov. 2, 2021

(54) CAMERA MODULE ACTUATOR

(71) Applicant: SAMSUNG ELECTRO-MECHANICS CO., LTD., Suwon-si (KR)

(72) Inventors: Hong Joo Lee, Suwon-si (KR); Dong Yeon Shin, Suwon-si (KR); Nam Ki Park, Suwon-si (KR); Shin Young Cheong, Suwon-si (KR); Byung Gi Ahn, Suwon-si (KR); Hoon Heo, Suwon-si (KR); Je Hyun Bang, Suwon-si (KR); Yun Tae Lee, Suwon-si (KR); Ick Chan Shim, Suwon-si (KR); Young Bok Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 932 days.

(21) Appl. No.: 15/698,290

(22) Filed: Sep. 7, 2017

(65) Prior Publication Data
US 2018/0095341 A1    Apr. 5, 2018

(30) Foreign Application Priority Data

Oct. 4, 2016   (KR) .................. 10-2016-0127699
Apr. 10, 2017  (KR) .................. 10-2017-0046262

(51) Int. Cl.
*G02B 7/02*       (2021.01)
*G03B 3/10*       (2021.01)
(Continued)

(52) U.S. Cl.
CPC ................ *G03B 3/10* (2013.01); *G02B 7/08* (2013.01); *G02B 27/646* (2013.01);
(Continued)

(58) Field of Classification Search
CPC .... G03B 2205/0069; G03B 3/10; G02B 7/08; G02B 27/646; G02B 7/36; G02B 13/001;
(Continued)

(56) References Cited

U.S. PATENT DOCUMENTS 8,547,477 B2 * 10/2013 Knodgen ............. H02K 11/225
                                                        348/363
2005/0168584 A1    8/2005 Uenaka
(Continued)

FOREIGN PATENT DOCUMENTS

CN      101253390 A      8/2008
CN      202472099 U     10/2012
(Continued)

OTHER PUBLICATIONS

Korean Office Action dated Mar. 6, 2018, in corresponding Korean Application No. 10-2017-0046262 (8 pages in English, 5 pages in Korean).
(Continued)

Primary Examiner — Alicia M Harrington
(74) Attorney, Agent, or Firm — NSIP Law

(57) ABSTRACT

An actuator includes a magnet, a driving coil facing the magnet, a driver, and a position calculation processor. The driver is configured to move the magnet in at least one of an optical axis direction and a direction perpendicular to the optical axis by applying a driving signal to the driving coil. The position calculation processor includes sensing coils, and is configured to calculate a position of the magnet according to inductance levels of an inductor of the sensing coils. The inductance levels vary according to movements of the magnet.

23 Claims, 8 Drawing Sheets

(51) Int. Cl.
  *G02B 27/64* (2006.01)
  *G02B 7/08* (2021.01)
  *H04N 5/225* (2006.01)
  *H04N 5/232* (2006.01)
  *G02B 13/00* (2006.01)
  *G02B 7/36* (2021.01)

(52) U.S. Cl.
  CPC ....... *H04N 5/2257* (2013.01); *H04N 5/23287* (2013.01); *G02B 7/36* (2013.01); *G02B 13/001* (2013.01); *G03B 2205/0069* (2013.01); *H04N 5/23212* (2013.01)

(58) Field of Classification Search
  CPC ............. H04N 5/2257; H04N 5/23287; H04N 5/23212
  See application file for complete search history.

(56) References Cited

U.S. PATENT DOCUMENTS

| | | | |
|---|---|---|---|
| 2011/0142433 A1* | 6/2011 | Gerhards | G03B 5/00 396/72 |
| 2012/0154614 A1 | 6/2012 | Moriya et al. | |
| 2013/0321937 A1 | 12/2013 | Baik et al. | |
| 2014/0333829 A1 | 11/2014 | Lee et al. | |
| 2014/0347075 A1 | 11/2014 | Goto et al. | |
| 2015/0229814 A1 | 8/2015 | Macours et al. | |
| 2016/0142634 A1* | 5/2016 | You | G03B 29/00 348/208.2 |
| 2016/0216529 A1 | 7/2016 | Park et al. | |
| 2016/0258736 A1* | 9/2016 | Bachar | H04N 5/232 |

FOREIGN PATENT DOCUMENTS

| | | | | |
|---|---|---|---|---|
| CN | 103998275 A | | 8/2014 | |
| CN | 104142600 A | | 11/2014 | |
| CN | 104253940 A | | 12/2014 | |
| CN | 104793432 A | | 7/2015 | |
| CN | 104852643 A | | 8/2015 | |
| CN | 105824168 A | | 8/2016 | |
| CN | 208044173 U | | 11/2018 | |
| EP | 3086154 A1 | * | 10/2016 | ............... G02B 7/08 |
| JP | 2005-215454 A | | 8/2005 | |
| JP | 2009-271204 A | | 11/2009 | |
| JP | 2012-177754 A | | 9/2012 | |
| KR | 10-1061245 B1 | | 9/2011 | |
| KR | 10-1166418 B1 | | 7/2012 | |
| KR | 10-2013-0005851 A | | 1/2013 | |
| KR | 10-2013-0077216 A | | 7/2013 | |
| KR | 10-1332043 B1 | | 11/2013 | |
| KR | 10-2014-0132468 A | | 11/2014 | |
| WO | WO 2007/000653 A1 | | 1/2007 | |
| WO | WO 2014/207298 A1 | | 12/2014 | |

OTHER PUBLICATIONS

Chinese Office Action dated Oct. 23, 2019 in counterpart Chinese Patent Application No. 201710916248.6 (20 pages in English and 11 pages in Chinese).

Chinese Office Action dated May 8, 2020 in corresponding Chinese Patent Application No. 201710916248.6. (6 pages in English, 5 pages in Chinese).

* cited by examiner

CAMERA MODULE ACTUATOR

CROSS-REFERENCE TO RELATED APPLICATION(S)

This application claims the benefit under 35 U.S.C. § 119(a) of Korean Patent Application No. 10-2016-0127699, filed on Oct. 4, 2016 and No. 10-2017-0046262, filed on Apr. 10, 2017 in the Korean Intellectual Property Office, the entire disclosure of which is incorporated herein by reference for all purposes.

BACKGROUND

1. Field

The present disclosure relates to a camera module actuator.

2. Description of Related Art

In general, portable communications terminals, such as mobile phones, personal digital assistants (PDAs), portable personal computers (PCs), and similar electronic devices are used to transmit text messages or voice data, and image data. To meet the demands of such a trend, camera modules are standardly installed in the portable communications terminals to allow users to capture images, use video chat features, and the like.

Generally, a camera module includes a lens barrel having lenses therein. The lens barrel is accommodated inside a housing. The housing also accommodates an image sensor to convert light forming images of subjects into electric signals. As camera modules, single focus camera modules capturing images of objects at a fixed focus may be employed, but as a result of technological advancements, a camera module including an actuator capable of performing autofocusing (AF) has been adopted. Furthermore, a camera module may employ an actuator having an optical image stabilization (OIS) function to reduce resolution degradation caused by hand-shake.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments include an actuator configured to precisely detect a position of a magnet, without employing a hall sensor.

In accordance with an example, there is provided an actuator, including: a magnet; a driving coil facing the magnet; a driver configured to move the magnet in at least one of an optical axis direction and a direction perpendicular to the optical axis by applying a driving signal to the driving coil; and a position calculation processor including sensing coils, and configured to calculate a position of the magnet according to inductance levels of an inductor of the sensing coils, wherein the inductance levels vary according to movements of the magnet.

The sensing coils may be disposed in a direction of the movements of the magnet.

The position calculation processor may calculate the position of the magnet according to directions of an increase and decrease in the inductance levels of the sensing coils.

The position calculation processor may calculate the position of the magnet according to the inductance levels of the sensing coils upon the directions of the increase and decrease in the inductance levels of the sensing coils being different from each other.

The position calculation processor may calculate the position of the magnet excluding the inductance levels of the sensing coils upon the directions of the increase and decrease in the inductance levels of the sensing coils being the same.

The position calculation processor may output the inductance levels of the sensing coils as oscillation signals.

The position calculation processor may calculate the position of the magnet according to frequencies of the oscillation signals.

The position calculation processor may calculate the frequencies of the oscillation signals by counting the frequencies of the oscillation signals using a reference clock.

The position calculation processor may calculate the position of the magnet based on the position of the magnet corresponding to the frequencies of the oscillation signals.

In accordance with an example, there is provided an actuator, including: a magnet; a driving coil facing the magnet; a driver configured to move the magnet in at least one of an optical axis direction and a direction perpendicular to the optical axis by applying a driving signal to the driving coil; and a position calculation processor including a sensing coil, wherein an inductance level of the sensing coil varies according to movements of the magnet, wherein the sensing coil is disposed in a direction along the movements of the magnet.

The driving coil and the sensing coil may be formed by providing a conductive pattern to a substrate including layers.

The driving coil and the sensing coil may be formed in different regions in a direction that the layers may be stacked.

The driving coil and the sensing coil may be formed in a same region in a direction that the layers may be stacked.

The driving coil may be formed in a portion of the layers, and the sensing coil is formed in another portion of the layers.

One of the layers, having the sensing coil formed therein, may be disposed between layers each having the driving coil formed therein.

The sensing coil may have at least one of circular shape, triangular shape, and quadrangular shape.

In accordance with an example, there is provided an actuator, including: a magnet disposed on a side of a lens holder of a lens module; a driving coil disposed on a substrate, facing the magnet, to move the lens module in an optical axis direction; and a position calculation processor including sensing coils positioned on the substrate facing the magnet, wherein a change in magnitude of a magnetic field generated by the magnet varies an inductance of the sensing coils to determine a displacement of the lens module.

The sensing coils may further include two sensing coils disposed in the optical axis direction.

The sensing coils may further include two sensing coils disposed in a direction perpendicular to the optical axis direction.

The sensing coils may further include two sensing coils, in which an inductance level of one of the two sensing coils decreases and an inductance level of the other of the two sensing coils increases.

In accordance with an example, there is provided an actuator, including: a magnet disposed on a side of a lens holder of a lens module; a driving coil disposed on a substrate, facing the magnet, to move the lens module in an optical axis direction; and a position calculation processor including sensing coils, positioned opposite to each other, on the substrate and opposite to the magnet, wherein a change in a position of the magnet changes a resonance frequency of the sensing coils to determine a displacement of the lens module.

The position calculation processor may further include: an oscillation processor may further include the sensing coils, a capacitor, and a resistor, wherein the oscillation processor is configured to generate an oscillation signal to determine the resonance frequency thereof based on an inductance level of one of the sensing coils, an arithmetic processor configured to calculate the resonance frequency of the oscillation signal, and a determination processor configured to determine the position of the magnet based on the resonance frequency of the oscillating signal.

A magnetic body having high magnetic permeability and a paint formed of a magnetic material may be formed between the magnet and the oscillation processor to raise a rate of change in the inductance of the one of the sensing coils based on a change in the position of the magnet.

The position calculation processor may calculate the position of the magnet according to frequencies of oscillation signals generated on the basis of changes in inductance levels of the sensing coils.

The sensing coils may have different shapes from each other, where the shapes include a circular shape, a triangular shape, and a quadrangular shape.

Other features and aspects will be apparent from the following detailed description, the drawings, and the claims.

Figure 1:
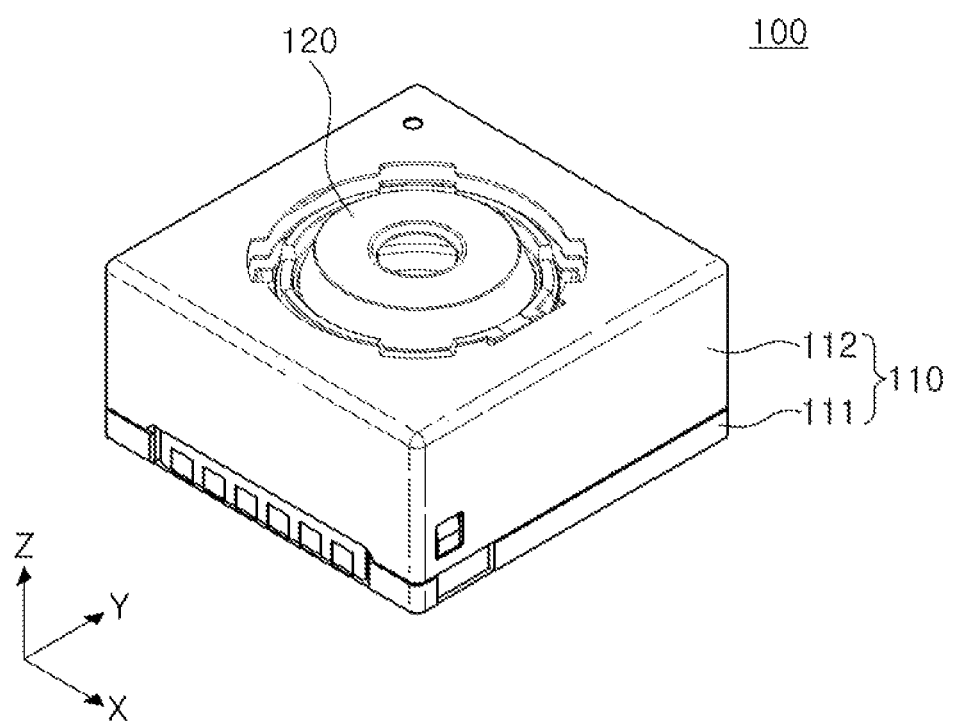
FIG. 1 is a perspective view of a camera module, according to an example.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The features described herein may be embodied in different forms, and are not to be construed as being limited to the examples described herein. Rather, the examples described herein have been provided so that this disclosure will be thorough and complete, and will convey the full scope of the disclosure after an understanding of the disclosure of this application.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

When an element is referred to as being "on," "connected to," "coupled to," or "adjacent to," another element, the element may be directly on, connected to, coupled to, or adjacent to, the other element, or one or more other intervening elements may be present.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms, including technical terms and scientific terms, used herein have the same meaning as how they are generally understood after an understanding of the disclosure of this application. Any term that is defined in a general dictionary shall be construed to have the same meaning in the context of the relevant art, and, unless otherwise defined explicitly, shall not be interpreted to have an idealistic or excessively formalistic meaning.

Identical or corresponding elements will be given the same reference numerals, regardless of the figure number, and any redundant description of the identical or corresponding elements will not be repeated. Throughout the description of the present disclosure, when describing a certain relevant conventional technology is determined to evade the point of the present disclosure, the pertinent detailed description will be omitted. Terms such as "first" and "second" can be used in describing various elements, but the above elements shall not be restricted to the above terms. The above terms are used only to distinguish one element from the other. In the accompanying drawings, some elements may be exaggerated, omitted or briefly illustrated, and the dimensions of the elements do not necessarily reflect the actual dimensions of these elements.

Subsequently, examples are described in further detail with reference to the accompanying drawings.

FIG. 1 is a perspective view of a camera module 100, according to an example.

The camera module 100 includes a housing unit 110 and a lens barrel 120, and the housing unit 110 includes a housing 111 and a shielding case 112. The camera module 100 has at least one of an autofocusing (AF) function and an optical image stabilization (OIS) function. In an example, the lens barrel 120 moves in a direction of an optical axis and in a direction perpendicular to the optical axis, respectively, inside the housing unit 110, such that the camera module 100 is able to perform the AF function and the OIS function. Also, the optical axis is a line along which there is some degree of rotational symmetry in an optical system such as a camera lens or microscope. The optical axis is an imaginary line that defines the path along which light propagates through at least one lens, up to first approximation. For a lens system including lenses and mirrors, the axis passes through the center of curvature of each surface, and coincides with the axis of rotational symmetry. The optical axis is often coincident with the system's mechanical axis, but not always, as in the case of off-axis optical systems.

Figure 2:
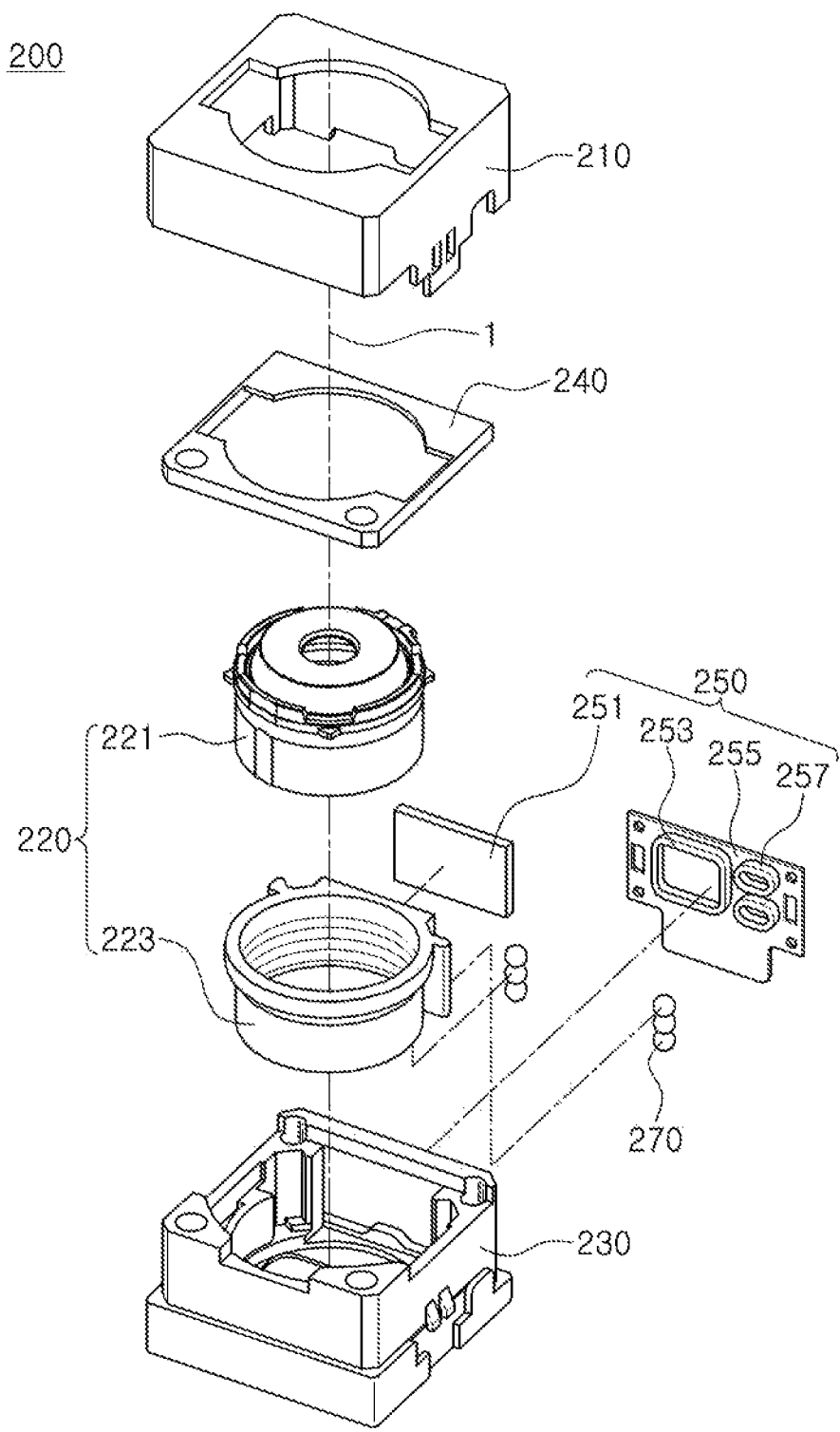
FIG. 2 is an exploded perspective view of a camera module, according to an example.

FIG. 2 is an exploded perspective view of a camera module 200, according to an example.

Referring to FIG. 2, the camera module 200, according to the example, includes a shielding case 210, a lens module 220, a housing 230, a stopper 240, an actuator 250, and a ball bearing 270.

The lens module 220 includes a lens barrel 221, and a lens holder 223 receiving the lens barrel 221 therein.

The lens barrel 221 has a hollow cylindrical shape such that a plurality of lenses for imaging a subject are positioned and received therein. The lenses are disposed in the lens barrel 221 along an optical axis direction 1, from an object side (position of subject) to an image side (position of image sensor). The lenses are provided in a required number depending on a design of the lens module 220, and have optical characteristics, such as equal or different refractive indexes, refractive power, object-side surfaces, and image-side surfaces, respectively.

The lens barrel 221 is coupled to the lens holder 223. In an example, the lens barrel 221 is inserted into a hollow of the lens holder 223, and the lens barrel 221 and the lens holder 223 are coupled in a screw coupled manner, bonded with an adhesive or using any other mechanical element, such as a bracket. The lens module 220 is received inside the housing 230 to move in the optical axis direction 1 for autofocusing.

The actuator 250 moves the lens module 220 in the optical axis direction 1. The lens module 220 includes a magnet 251 mounted on one side of the lens holder 223, and a driving coil 253 facing the magnet 251 to move the lens module 220 in the optical axis direction 1. The driving coil is mounted on a substrate 255, and the substrate 255 is mounted on the housing 230, such that the driving coil 253 faces the magnet 251.

The actuator 250 applies a driving signal to the driving coil 253. The actuator 250 includes an H bridge circuit that may be driven bi-directionally, therein, and applies the driving signal to the driving coil 253 using a voice coil motor method.

The actuator 250 applies or provides the driving signal to the driving coil 253 to move the lens module 220 in the optical axis direction 1. The actuator 250 applies the driving signal to the driving coil 253 to provide driving force to the magnet 251, and the driving force of the magnet 251 creates a magnetic field with the driving coil 253 to move the lens module 220 in the optical axis direction 1. When the driving signal is applied to the driving coil 253, a magnetic flux is generated by the driving coil 253, and interacts with the magnetic field, generated by the magnet 251, to generate driving force for moving the lens module 220 in the optical axis direction 1 according to Fleming's left hand rule.

The magnet 251 includes a first magnet and a second magnet. The first magnet and the second magnet are formed by polarizing the magnet 251 so that the lens module 220 is easy to move. The actuator 250 uses the magnet 251 to detect a position of the lens module 220.

The actuator 250 includes a sensing coil 257 mounted on the substrate 255 to oppose the magnet 251. In one configuration, the substrate 255 is a flexible circuit printed board. The sensing coil 257 is disposed outside of the driving coil 253 and, as illustrated in FIG. 2, the sensing coil 257 includes at least one coil.

An inductance level of the sensing coil 257 is changed according to displacement of the magnet 251. When the magnet 251 moves in a certain direction, because a magnitude of the magnetic field generated by the magnet 251 changes, such magnitude change influences an inductance of the sensing coil 257.

The actuator 250 determines displacement of the lens module 220, based on a change in the inductance of the sensing coil 257. In an example, the actuator 250 additionally has at least one capacitor. The capacitor and the sensing coil 257 form an oscillation circuit. In an example, a number of the capacitor corresponds to a number of sensing coils 257, so that the capacitor and the sensing coil 257 are configured in the same manner as that of an LC oscillator or the well-known Colpitts oscillator.

The actuator 250 determines the displacement of the lens module 220 based on a change in a frequency of an oscillation signal generated by the oscillation circuit. When the inductance of the sensing coil 257 forming the oscillation circuit changes, the frequency of the oscillation signal generated by the oscillation circuit changes, so that the displacement of the lens module 220 is detected based on the frequency change.

When the lens module 220 moves in the optical axis direction 1 within the housing 230, the ball bearing 270 is provided as a guide means guiding the movement of the lens module 220. The ball bearing 270 includes one or more ball bearings and, when a plurality of ball bearings are provided, the ball bearings are disposed in the optical axis direction 1. Although FIG. 2 illustrates three ball bearings 270 to move the lens barrel 221 in the optical axis direction, a single ball bearing 270 may be implemented or more than three ball bearings 270 may be implemented, on each guide portion of the lens barrel.

The ball bearing 270 contacts an external surface of the lens holder 223 and an internal surface of the housing 230 to guide the movement of the lens module 220 in the optical axis direction 1. For example, the ball bearing 270 is disposed between the lens holder 223 and the housing 230, and guides the movement of the lens module 220 in the optical axis direction 1 with a rolling motion. In an alternative configuration, the ball bearings 270 are disposed on one internal corner or side of the housing 230 and sliding within a guiding portion of the housing 230. The ball bearings 270 would support the movement of the lens holder 223 when the holder 250 moves in the optical axis direction within the housing 230.

The stopper 240 is mounted on the housing 230 to restrict a travel distance of the lens module 220. In an example, the stopper 240 is mounted on an upper surface of the housing 230, and the stopper 240 and the lens module 220 are spaced apart from each other in the optical axis direction 1 when the driving coil 253 is unpowered. Although the stopper 240 is illustrated in FIG. 2 as a single structural element, the stopper 240 may be formed of at least two separate plates operatively and mechanically connected to each other to, at least, restrict the travel distance of the lens module 220. Thus, when the lens module 220 moves in the optical axis direction 1 by power applied to the driving coil 253, the stopper 240 restricts the travel distance of the lens module 220, so that the lens module 220 moves along the optical axis in a range of an interval to the stopper 240. The stopper 240 is formed of a material having elasticity, such as polyurethane, to alleviate impacts generated when the stopper 240 and the lens module 220 collide with each other.

The shielding case 210 is coupled to the housing 230 to enclose an external surface of the housing 230, and blocks electromagnetic waves generated while the camera module 200 is driven.

The camera module 200 generates the electromagnetic waves while being driven, and when such electromagnetic waves are emitted externally of the camera module 200, the electromagnetic waves may affect other electronic component causing communications errors or malfunctions. To prevent such a problem, the shielding case 210 is formed of a metal and grounded to a ground pad of a substrate mounted on a lower surface of the housing 230 to block the electromagnetic waves. In a different manner, when the shielding case 210 is formed as a plastic molded article, an internal surface of the shielding case 210 is coated with a conductive paint to block the electromagnetic waves. A conductive epoxy is used as, but is not limited to, the conductive paint. In addition, various types of conductive materials are used, and a conductive film or a conductive tape is attached to the internal surface of the shielding case 210.

Figure 3:
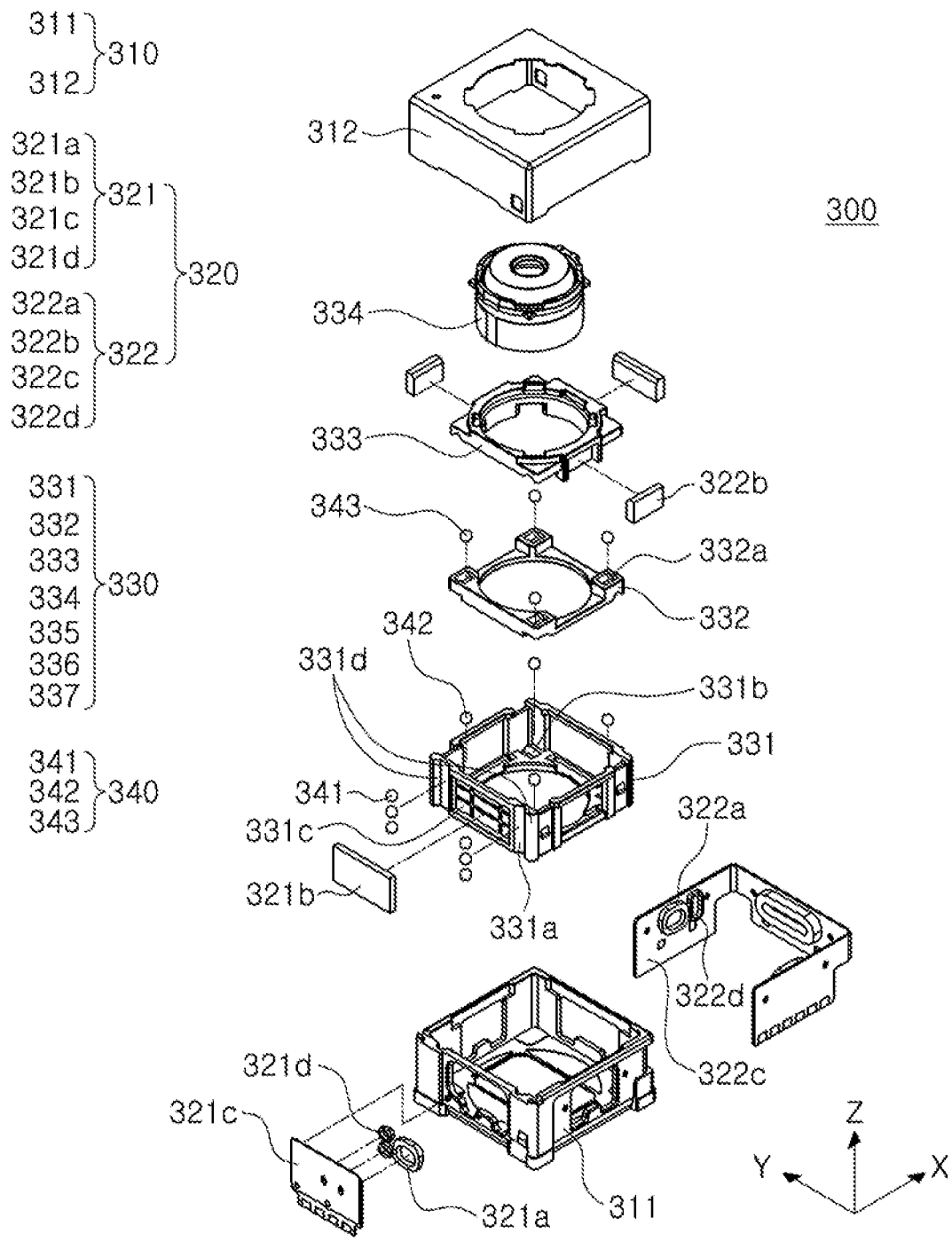
FIG. 3 is an exploded perspective view of a camera module, according to another example.

FIG. 3 is an exploded perspective view of a camera module 300, according to another example.

Referring to FIG. 3, the camera module 300, according to another example, includes a housing unit 310, an actuator 320, and a lens module 330.

The housing unit 310 includes a housing 311 and a shielding case 312. The housing 311 is formed of a material easy to mold. In an example, the housing 311 is formed of plastic. The housing 311 has one or more actuators 320 mounted thereon. In an example, the housing 311 has a portion of a first actuator 321 mounted on a first side surface thereof. A portion of a second actuator 322 is mounted on second to fourth side surfaces of the housing 311. The housing 311 receives the lens module 330 therein. In an example, the housing 311 has a space formed therein to receive an entire or a portion of the lens module 330.

The housing 311 has six open surfaces. In an example, the housing 311 has an opening formed in a lower surface thereof to mount an image sensor, and an opening formed in an upper surface thereof to mount the lens module 330. Further, the housing 311 has an opening formed in the first side surface thereof to enable a first driving coil 321a of the first actuator 321 to be inserted therein. Also, the housing 311 has an opening formed in each of the second to fourth side surfaces thereof to enable a second driving coil 322a of the second actuator 322 to be inserted therein.

The shielding case 312 covers a portion of the housing 311. In an example, the shielding case 312 covers the upper surface and the first to fourth side surfaces of the housing 311. In a different example, the shielding case 312 covers only the first to fourth side surfaces of the housing 311, or partially covers the upper surface and the first to fourth side surfaces of the housing 311.

The actuator 320 includes a plurality of actuators. In an example, the actuator 320 includes the first actuator 321 moving the lens module 330 in a Z-axis direction, and the second actuator 322 moving the lens module 330 in X- and Y-axis directions.

The first actuator 321 is mounted on the housing 311 and a first frame 331 of the lens module 330. In an example, a portion of the first actuator 321 is mounted on the first side surface of the housing 311, and another portion of the first actuator 321 is mounted on a first side surface of the first frame 331. The first actuator 321 moves the lens module 330 in an optical axis direction (the z-axis direction of FIG. 3). In an example, the first actuator 321 includes the first driving coil 321a, a first magnet 321b, a first substrate 321c, and at least one first sensing coil 321d. The first driving coil 321a and the at least one first sensing coil 321d are formed on the first substrate 321c. The first substrate 321c is mounted on the first side surface of the housing 311, and the first magnet 321b is mounted on the first side surface of the first frame 331, facing the first substrate 321c.

The first actuator 321 applies a driving signal to the first driving coil 321a. The first actuator 321 includes an H bridge circuit that may be bidirectionally driven, and applies the driving signal to the first driving coil 321a using a voice coil motor method. When the driving signal is applied to the first driving coil 321a, a magnetic flux is generated by the first driving coil 321a, and interacts with a magnetic field that is generated by the first magnet 321b to generate a driving force that enables the first frame 331 and a lens barrel 334 to move relatively with respect to the housing 311. Similar to the actuator 250 of FIG. 2, the first actuator 321 determines displacements of the lens barrel 334 and the first frame 331 based on a change in the inductance of the at least one first sensing coil 321d. The first magnet 321b, as illustrated in FIG. 3, is disposed on a surface 331c of the first frame 331 and, alternatively, also disposed on one of first to fourth edges 331d of the first frame 331.

The second actuator 322 is mounted on the housing 311 and a third frame 333 of the lens module 330. In an example, a portion of the second actuator 322 is mounted on the second to fourth side surfaces of the housing 311, and other portions of the second actuator 322 are mounted on second to fourth side surfaces of the third frame 333. In a different example, the second actuator 322 is also mounted on the housing 311 and the second to fourth edges contacting the second to fourth side surfaces of the third frame 333. In the above description, the second actuator 322 is formed on either the second to fourth side surfaces or the second to fourth edges, which independently provides the driving force to the lens module 330. Thus, the second actuator 322, according to the example, is formed on a portion of the second to fourth side surfaces. Hereinafter, for convenience of description, it is assumed that the actuator, formed on the second side surface, is the second actuator 322. The following description is also applied to the actuators formed on the other side surfaces or the other edges.

The second actuator 322 moves the lens module 330 in a direction perpendicular to the optical axis. In an example, the second actuator 322 includes the second driving coil 322a, a second magnet 322b, a second substrate 322c, and at least one second sensing coil 322d. The second driving coil 322a and the second sensing coil 322d are formed on the second substrate 322c. The second substrate 322c generally has a U-shape, and is mounted on the housing 311 to enclose the second to fourth side surfaces of the housing 311. The second magnet 322b is mounted on the second side surface of the third frame 333 to face the second substrate 322c.

The second actuator 322 changes a magnitude and direction of magnetic force that is generated between the second driving coil 322a and the second magnet 322b, to enable a second frame 332 or the third frame 333 to move relatively with respect to the first frame 331. The lens barrel 334 moves in the same direction as the second frame 332 or the third frame 333 by movements of the second frame 332 or the third frame 333.

Similar to the actuator 250 of FIG. 2, the second actuator 322 detects a position of the second frame 332 or the third frame 333, based on a change in an inductance level of the second sensing coil 322d.

The lens module 330 is mounted on the housing unit 310. In an example, the lens module 330 disposed in a receiving space formed by the housing 311 and the shielding case 312 to move at least in a triaxial manner. In accordance with an embodiment, the housing 311, the first frame 331, the second frame 332, and the third frame 333 include guide parts to receive the ball bearings 343. A shape of one of the guide parts may be different from that of the other guide parts. For example, the one of the guide parts may be formed as a V-like groove, and the other guide parts may be formed as a U-like groove. A shape of the other guide parts is not particularly limited to a particular shape as long as, in one example, the other guide parts are different from the shape of the one of the guide parts. In an alternative example, all of the guide parts include a same shape.

In the case in which the other guide parts is different from that of the guide part 52, a separation of the ball member 343 may be prevented while the lens barrel 334 is vertically moved for autofocusing. In an example, at least one of the guide parts may have a flat surface or a flat surface connected to an inclined portion.

The lens module 330 includes a plurality of frames. In an example, the lens module 330 includes the first frame 331, the second frame 332, and the third frame 333. The first frame 331 is movable with respect to the housing 311. In an example, the above-mentioned first actuator 321 moves the first frame 331 in the optical axis direction (the Z-axis direction) of the housing 311. The first frame 331 has a plurality of first and second guide recesses 331a and 331b formed therein. In an example, the first frame 331 has the first guide recesses 331a formed in the first side surface thereof to extend in the optical axis direction (the Z-axis direction). The second guide recesses 331b are formed in the first to fourth edges of an internal bottom surface thereof, respectively, to extend in a first vertical direction (the Y-axis direction) perpendicular to the optical axis. The first frame 331 is manufactured to have at least three open side surfaces. In an example, the second to fourth side surfaces of the first frame 331 are open such that the second magnet 322b of the third frame 333 and the second driving coil 322a of the housing 311 face each other.

The second frame 332 is mounted on the first frame 331. In an example, the second frame 332 is mounted on an internal space of the first frame 331. The second frame 332 is movable in the first vertical direction (the Y-axis direction) perpendicular to the optical axis with respect to the first frame 331. In an example, the second frame 332 moves in the first vertical direction (the Y-axis direction) perpendicular to the optical axis along the second guide recesses 331b of the first frame 331. The second frame 332 has a plurality of third guide recesses 332a formed therein. In an example, the second frame 332 has four third guide recesses 332a formed in first to fourth edges thereof to extend in a second vertical direction (the X-axis direction) perpendicular to the optical axis.

The third frame 333 is mounted on the second frame 332. In an example, the third frame 333 is mounted on an upper surface of the second frame 332. The third frame 333 is movable in the second vertical direction (the X-axis direction) perpendicular to the optical axis with respect to the second frame 332. In an example, the third frame 333 moves in the second vertical direction (the X-axis direction) perpendicular to the optical axis along the third guide recesses 332a of the second frame 332. The third frame 333 has a plurality of second magnets 322b mounted thereon. In an example, the third frame 333 has at least two second magnets 322b mounted on the second to fourth side surfaces thereof, respectively. The two second magnets 322b have three second magnets 322b mounted on the second to fourth side surfaces thereof, respectively.

In the above-mentioned example, the third frame 333 is integrated with the second frame 332. In an example, the third frame 333 may be removed or omitted, and the second frame 332 is movable in the first vertical direction (the Y-axis direction) and the second vertical direction (the X-axis direction) perpendicular to the optical axis.

The lens module 330 includes the lens barrel 334, which includes one or more lenses. The lens barrel 334 is mounted on the third frame 333. In an example, the lens barrel 334 is fitted to the third frame 333 to move together with the third frame 333. The lens barrel 334 is movable in the optical axis direction (the Z-axis direction) and the first and second vertical directions (the X- and Y-axis directions), perpendicular to the optical axis. In an example, the lens barrel 334 moves in the optical axis direction (the Z-axis direction) by the first actuator 321, and moves in the first and second vertical directions (the X- and Y-axis directions) perpendicular to the optical axis by the second actuator 322.

A ball bearing 340 guides movements of the lens module 330. In an example, the ball bearing 340 allows the lens module 330 to move smoothly in the optical axis direction and the first and second vertical directions perpendicular to the optical axis. The ball bearing 340 includes a first ball bearing 341, a second ball bearing 342, and a third ball bearing 343. In an example, the first ball bearing 341 is disposed in each of the first guide recesses 331a, so that the first frame 331 moves smoothly in the optical axis direction. In another example, the second ball bearing 342 is disposed in each of the second guide recesses 331b, so that the second frame 332 moves smoothly in the first vertical direction, perpendicular to the optical axis. In another example, the third ball bearing 343 is disposed in each of the third guide recesses 332a, so that the third frame 333 moves smoothly in the second vertical direction, perpendicular to the optical axis.

Each of the first and second ball bearings 341 and 342 has at least two to three balls, disposed in the first or second guide recess 331a or 331b, respectively. Alternatively, each of the first and second ball bearings 341 and 342 has at least four balls, disposed in the first or second guide recess 331a or 331b, respectively.

A lubricating material for friction and noise reduction is provided in substantially all portions of the camera module 300 in which the ball bearing 340 is disposed. In an example, each of the first to third guide recesses 331a, 331b, and 332a has a viscous fluid injected thereinto. Grease, having excellent viscosity and lubricity, may be used as the viscous fluid.

Figure 4:
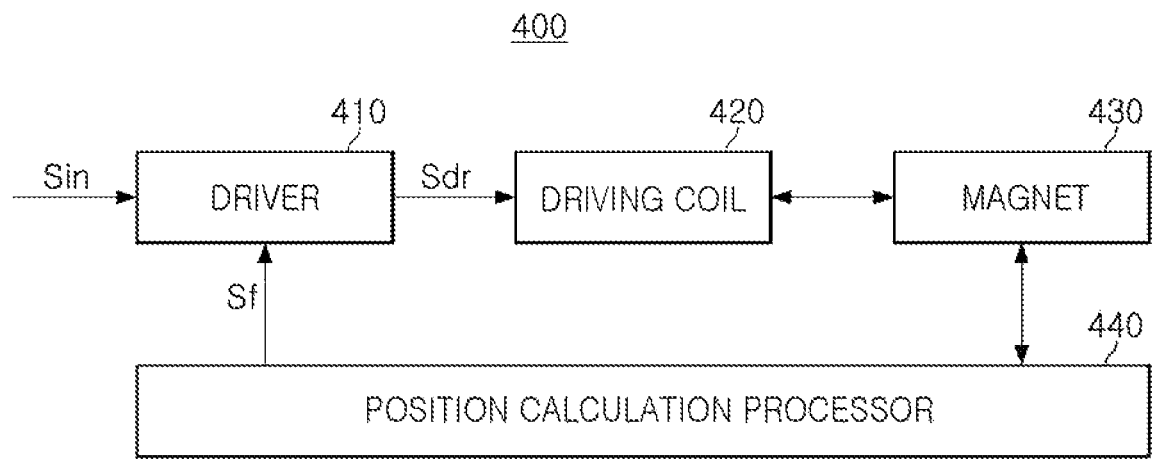
FIG. 4 is a block diagram of an actuator employed in a camera module, according to an example.

FIG. 4 is a block diagram of an actuator 400 employed in a camera module, according to an example.

The actuator 400 of FIG. 4 corresponds to the actuator 250 of FIG. 2, and the first actuator 321 and the second actuator 322 of FIG. 3. When the actuator 400 of FIG. 4 corresponds to the actuator 250 of FIG. 2 and the first actuator 321 of FIG. 3, the actuator 400 moves a lens barrel in an optical axis direction to perform an AF function of the camera module. Thus, when the actuator 400 of FIG. 4 performs the AF function, a driver 410, to be later described, applies a driving signal to a driving coil 420 to provide driving force to a magnet 430 in the optical axis direction.

Further, when the actuator 400 of FIG. 4 corresponds to the second actuator 322 of FIG. 3. The actuator 400 moves the lens barrel in a direction perpendicular to the optical axis to perform an OIS function of the camera module. Thus, when the actuator 400 of FIG. 4 performs the OIS function, the driver 410, to be later described, applies a driving signal to the driving coil 420 to provide driving force to the magnet 430 in the direction perpendicular to the optical axis.

The driver 410 receives an input signal, Sin, applied from an external source and a feedback signal, Sf, generated by a position calculation processor 440, and provides or outputs a driving signal, Sdr, to the driving coil 420.

When the driving signal, Sdr, from the driver 410 is applied to the driving coil 420, an electromagnetic interaction between the driving coil 420 and the magnet 430 generates the driving force to the magnet 430, and causes the lens barrel to move in the optical axis direction or in the direction perpendicular to the optical axis.

The position calculation processor 440 detects a position of the magnet 430, moved by the electromagnetic interaction between the magnet 430 and the driving coil 420, to generate the feedback signal, Sf, and provides or outputs the feedback signal, Sf, to the driver 410. The position calculation processor 440 includes at least one sensing coil, and converts a change in an inductance level of the sensing coil, according to the movement of the magnet 430, into a frequency to calculate the position of the magnet 430. The sensing coil of the position calculation processor 440 corresponds to at least one sensing coil included in the actuator 250 of FIG. 2 and the first actuator 321 and the second actuator 322 of FIG. 3.

Figure 5:
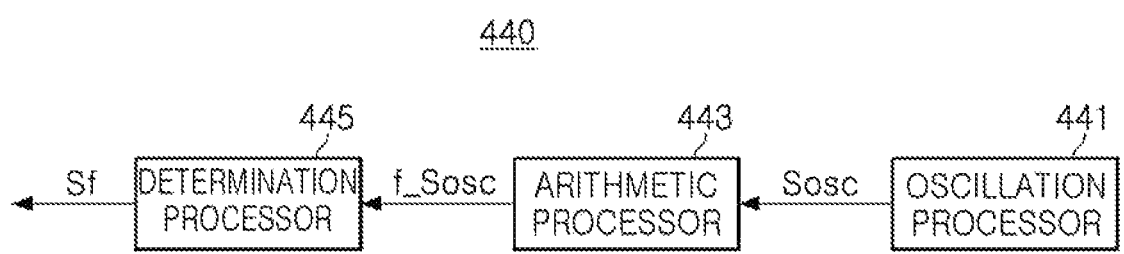
FIG. 5 is a block diagram illustrating a position calculation processor, according to an example.

FIG. 5 is a block diagram illustrating the position calculation processor 440, according to an example.

Referring to FIGS. 4 and 5, the position calculation processor 440 detects a position of the magnet 430, which will hereinafter be described.

The position calculation processor 440, according to an example, includes an oscillation processor 441, an arithmetic processor 443, and a determination processor 445.

The oscillation processor 441 includes an oscillation circuit to generate an oscillation signal, Sosc. The oscillation processor 441 includes at least one sensing coil included in the actuator 250 of FIG. 2 and the first actuator 321 and the second actuator 322 of FIG. 3. The oscillation processor 441 further includes at least one capacitor and at least one resistor. In an example, the oscillation circuit includes an LC oscillator including at least one sensing coil and at least one capacitor, and, in one example, is configured in the same manner as that of the well-known Colpitts oscillator. A frequency of the oscillation signal, Sosc, of the oscillation circuit is determined by an inductance level of the sensing coil.

When the oscillation circuit is implemented using the LC oscillator including the sensing coil and the capacitor, a frequency, f, of the oscillation signal, Sosc, is represented by the following equation 1. In Equation 1, I represents an inductance level of the at least one sensing coil, and c represents a capacitance of the at least one capacitor.

$$f = \frac{1}{2\pi\sqrt{lc}}$$ (Equation 1)

As mentioned above, when the magnet 430 moves as a result of a change in magnitude of a magnetic field thereof based on the driving force from the driver 410, such magnitude change influences or affects the inductance of the at least one sensing coil of the oscillation processor 441. Thus, a frequency of the oscillation signal, Sosc, output from the oscillation processor 441 changes according to the movement of the magnet 430.

According to an example, a magnetic body having high magnetic permeability and a paint formed of a magnetic material are formed between the magnet 430 and the oscillation processor 441 to raise a rate of change in the inductance of the sensing coil of the oscillation processor 441, depending on or based on the movement of the position of the magnet 430.

The arithmetic processor 443 calculates a frequency, f_Sosc, of the oscillation signal, Sosc, that is output from the oscillation processor 441. In an example, the arithmetic processor 443 calculates the frequency, f_Sosc, of the oscillation signal, Sosc, using a reference clock, CLK. The arithmetic processor 443 counts the oscillation signal Sosc using the reference clock, CLK, and calculates the frequency, f_Sosc, of the oscillation signal, Sosc, using the counted number of reference clocks, CLK, and a frequency of the reference clock, CLK. In an example, the arithmetic processor 443 counts the oscillation signal, Sosc, during a reference interval using the reference clock, CLK.

The determination processor 445 receives the frequency, f_Sosc, of the oscillation signal, Sosc, from the arithmetic processor 443 and determines the position of the magnet 430 according to the frequency, f_Sosc, of the oscillation signal Sosc. The determination processor 445 has a memory, which stores information regarding the position of the magnet 430 corresponding to the frequency, f_Sosc, of the oscillation signal, Sosc. The memory is implemented using a non-volatile memory including one of a flash memory, an electrically erasable programmable read-only memory (EEPROM), and a ferroelectric random access memory (FeRAM). The memory may further include a flash memory device. The flash memory device may store N-bit data via the memory controller. The N-bit data may be data that has been processed and/or is to be processed by the microprocessor, and N may be an integer equal to or greater than 1. If the computing system or computer is a mobile device, a battery may be provided to supply power to operate the computing system or computer. It will be apparent after an understanding of the disclosure of this application that the computing system or computer may further include an application chipset, a camera image processor, a mobile Dynamic Random Access Memory (DRAM), or any other component suitable for inclusion in a computing system or computer. The memory controller and the flash memory device may constitute a solid-state drive or disk (SSD) that uses non-volatile memory to store data.

When the arithmetic processor 443 transmits the frequency, f_Sosc, of the oscillation signal Sosc to the determination processor 445, the determination processor 445 determines the position of the magnet 430 based on the information regarding the position of the magnet 430 stored in the memory.

The oscillation processor 441, according to an example, includes at least one sensing coil, which includes a plurality of sensing coils. Each of the sensing coils is connected to at least one capacitor, respectively, to form an individual oscillation circuit.

When the actuator 400 performs the AF function, the sensing coils employed in the oscillation processor 441 are disposed in the optical axis direction. When the actuator 400 performs the OIS function, the sensing coils employed in the oscillation processor 441 are disposed in the direction perpendicular to the optical axis. According to an example, the sensing coils are disposed to be suitable for the function of the actuator 400.

The position calculation processor 440 calculates the position of the magnet 430 according to frequencies of oscillation signals generated on the basis of changes in inductance levels of the sensing coils.

Figure 6:
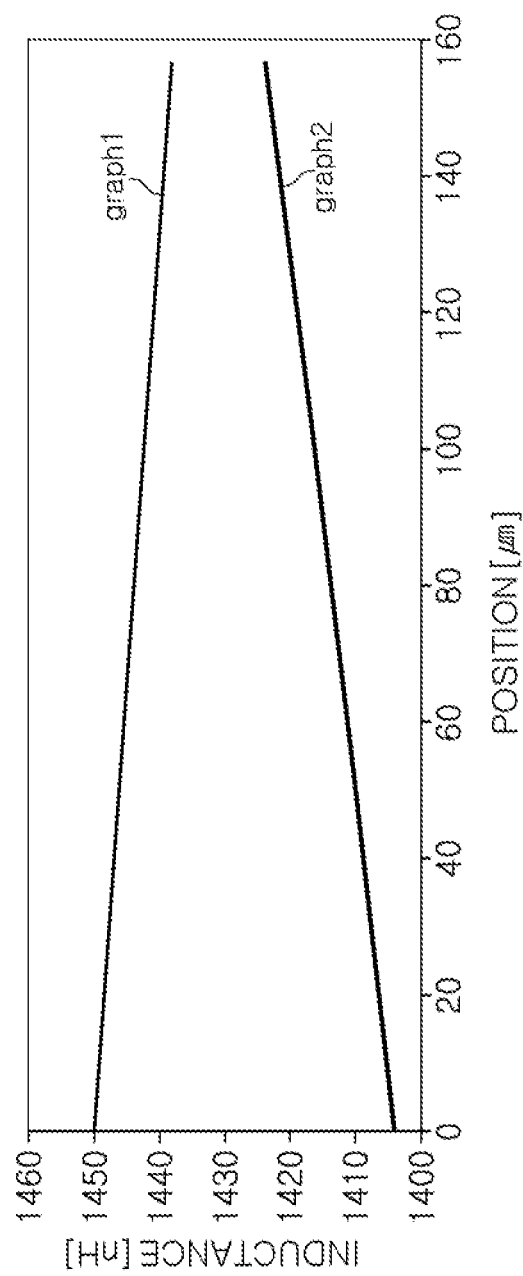
FIGS. 6 and 7 are graphs illustrating changes in inductance levels of sensing coils, according to an example.
Figure 7:
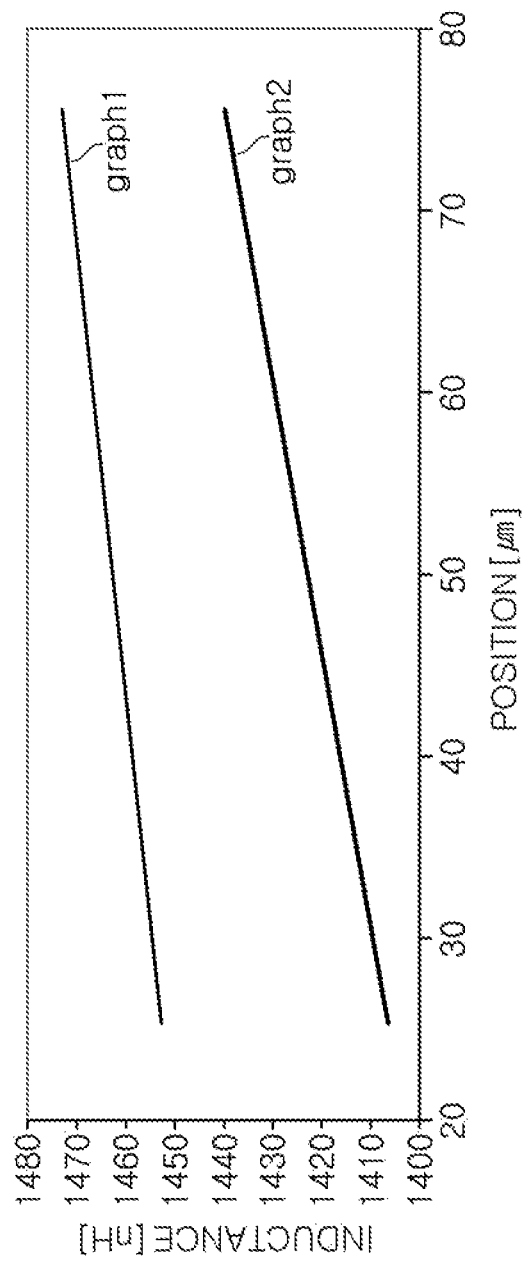

FIGS. 6 and 7 are graphs illustrating changes in inductance levels of a plurality of sensing coils, according to an example.

As described above, because the sensing coils are disposed to be suitable for the function of the actuator 400, when the magnet 430 moves, amounts of changes in the inductance levels of the sensing coils are different from each other. In an example, in an example in which the sensing coils include two sensing coils, an inductance level of one of the two sensing coils decreases, as illustrated in Graph 1 of FIG. 6, and an inductance level of the other of the two sensing coils increases, as illustrated in Graph 2 of FIG. 6. A frequency of an oscillation signal, output from an oscillation circuit connected to the one sensing coil, increases, and a frequency of an oscillation signal, output from an oscillation circuit connected to the other sensing coil, decreases. When determining that changes in an increase or decrease of frequency of a plurality of oscillation signals are in different directions, the determination processor 445 calculates the position of the magnet according to frequencies of the oscillation signals.

Referring to Graphs 1 and 2 of FIG. 7, inductance levels of the two sensing coils increase. In response to determining that changes in an increase or decrease of frequency of oscillation signals are in a same direction due to a corresponding increase or decrease of inductance of the two sensing coils, the determination processor 445 does not determine that the magnet 430 moves depending on an arrangement of the two sensing coils, so that the inductance levels of the two sensing coils change. Instead, the determination processor 445 determines that the magnet 430 moves due to changes in external factors such as temperature, or in a direction different from that of the arrangement of the two sensing coils, so that the inductance levels of the two sensing coils change. Thus, the determination processor 445 precisely or accurately detects a position of the magnet 430 by performing a process of determining a displacement of the magnet 430 regardless of changes in the inductance levels due to the external factors, and changes in the inductance levels, generated by the movement of the magnet 430 in the direction different from that of the arrangement of the two sensing coils.

Figure 8A:
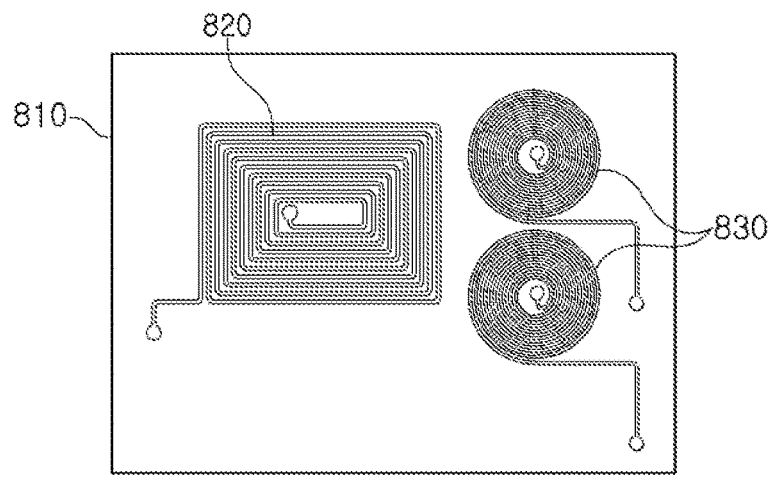
FIGS. 8A through 8C are diagrams of an actuator, according to an example.
Figure 8B:
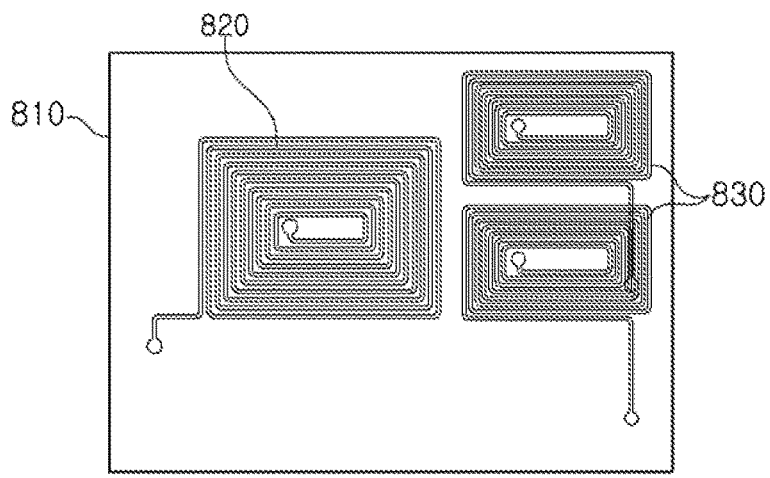
Figure 8C:
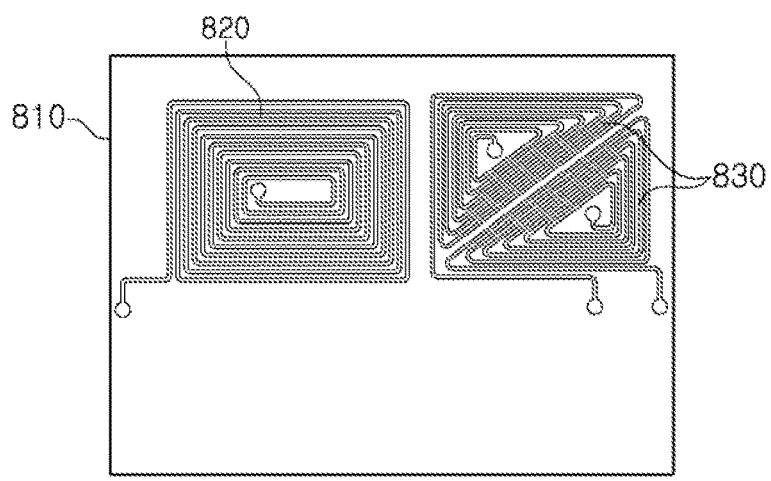

FIGS. 8A through 8C are diagrams of an actuator 800, according to an example.

The actuator 800, according to the example, includes a substrate 810, a driving coil 820, and at least one sensing coil 830. The driving coil 820 and the at least one sensing coil 830 are manufactured in a winding method, and mounted on the substrate 810.

The at least one sensing coil 830 is disposed outside of the driving coil 820. According to an example, the sensing coil 830 is disposed in a hollow portion or a center portion of the driving coil 820.

According to one example, the sensing coil 830 includes two sensing coils 830. According to another example, the sensing coil 830 includes a single sensing coil or at least three sensing coils.

Referring to FIGS. 8A through 8C, the two sensing coils 830 are disposed in the Z-axis direction to be used to detect a displacement of a magnet, opposite to the substrate 810, in the Z-axis direction.

The two sensing coils 830 are formed by winding a conducting wire to have a spiral shape. Referring to FIG. 8A, the two sensing coils 830 are wound to have a circular shape. Referring to FIG. 8B, the two sensing coils 830 are wound to have a quadrangular shape. Referring to FIG. 8C, the two sensing coils 830 are wound to have a triangular shape.

Figure 9:
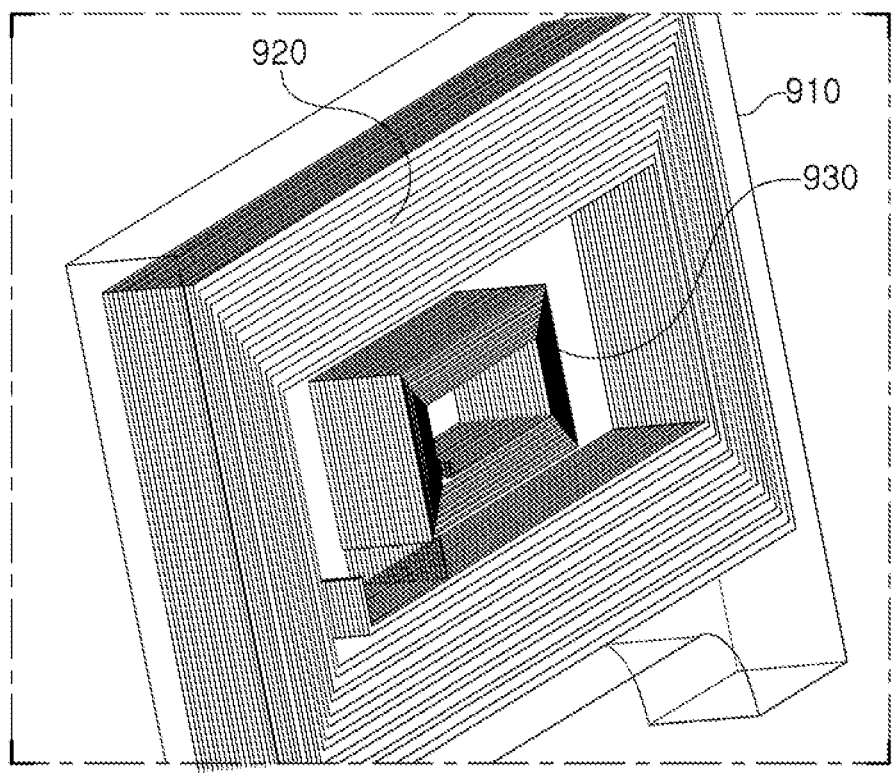
FIGS. 9 and 10 are diagrams of an actuator, according to another example.
Figure 10:
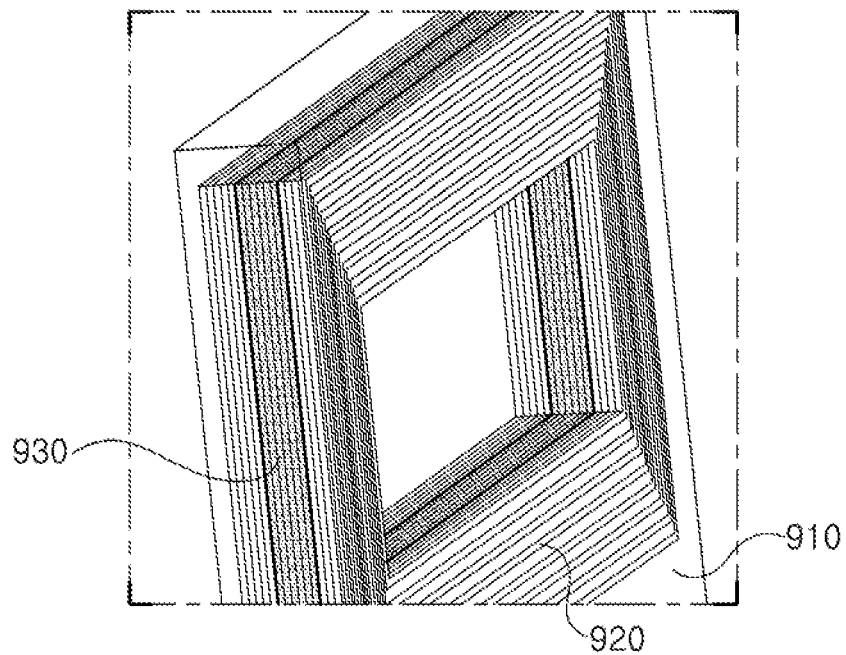

FIGS. 9 and 10 are diagrams of an actuator 900, according to another example.

The actuator 900, according to the example, includes a substrate 910, a driving coil 920, and at least one sensing coil 930. The substrate 910 has a multilayer substrate having a plurality of layers, and the driving coil 920 and the sensing coil 930 are formed by providing a conductive pattern to the layers.

According to an example, the driving coil 920 and the at least one sensing coil 930 are simultaneously formed through a single process, and a substrate for disposing a coil manufactured using a conventional winding method is removed, thus, reducing manufacturing costs. Further, a process of connecting an end of a coil, manufactured using a winding method, to a pad is removed, thus simplifying an actuator manufacturing process.

The sensing coil 930 includes a single sensing coil. According to an example, the sensing coil 930 includes at least two sensing coils.

Referring to FIG. 9, the driving coil 920 and the sensing coil 930 are formed in different regions of the substrate 910, in a direction in which the layers are stacked. In an example, the sensing coil 930 is disposed in a hollow portion or a center portion of the driving coil 920. According to an example, the sensing coil 930 is disposed outside or external to the driving coil 920.

Referring to FIG. 10, the driving coil 920 and the sensing coil 930 are formed in a same region of the substrate 910, in a direction in which the layers are stacked. In an example, within the same region in which the layers are stacked, the driving coil 920 is formed in a portion of the layers, and the sensing coil 930 is formed in the other portion of the layers. A layer, having the sensing coil 930 formed therein, is disposed between layers, having the driving coil 920 formed therein.

Thus, the camera module actuator, according to an example, detects a precise position of the magnet based on a change in the inductance of the sensing coil. Furthermore, due to the elimination of an additional hall sensor, manufacturing costs of the camera module actuator are effectively reduced, and space is efficiently used, thus, improving the configuration of the camera module actuator.

As set forth above, according to the examples, a camera module actuator may detect a precise position of a magnet from a change in an inductance level of a sensing coil. Furthermore, due to the elimination of an additional hall sensor, manufacturing costs of the camera module actuator may be reduced, and space efficiency thereof may be improved.

The driver 410, the position calculation processor 440, the determination processor 445, the arithmetic processor 443, and the oscillation processor 441 in FIGS. 4-5 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application.

The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator, comprising:
   a magnet;
   a driving coil facing the magnet;
   a driver configured to move the magnet in at least one of an optical axis direction and a direction perpendicular to the optical axis by applying a driving signal to the driving coil; and
   a position calculation processor, comprising sensing coils, configured to calculate a position of the magnet, according to frequencies of oscillation signals generated by counting the frequencies of the oscillation signals using a reference clock, based on inductance levels of an inductor of the sensing coils that excludes a subset of the inductance levels having same increasing or decreasing directions of inductance levels,
   wherein the inductance levels vary according to movements of the magnet.

2. The actuator of claim 1, wherein the sensing coils are disposed in a direction of the movements of the magnet.

3. The actuator of claim 2, wherein the position calculation processor calculates the position of the magnet according to the directions of the inductance levels of the sensing coils.

4. The actuator of claim 3, wherein the position calculation processor calculates the position of the magnet according to the inductance levels of the sensing coils upon the directions of the increase and decrease in the inductance levels of the sensing coils being different from each other.

5. The actuator of claim 1, wherein the position calculation processor outputs the inductance levels of the sensing coils as oscillation signals.

6. The actuator of claim 1, wherein the position calculation processor calculates the position of the magnet based on the position of the magnet corresponding to the frequencies of the oscillation signals.

7. An actuator, comprising:
a magnet;
a driving coil facing the magnet;
a driver configured to move the magnet in at least one of an optical axis direction and a direction perpendicular to the optical axis by applying a driving signal to the driving coil; and
a position calculation processor comprising a sensing coil, wherein inductance levels of the sensing coil varies according to movements of the magnet,
wherein the sensing coil is disposed in a direction along the movements of the magnet, and
wherein the position calculation processor calculates a position of the magnet according to frequencies of oscillation signals generated based on changes in the inductance levels by counting the frequencies of the oscillation signals using a reference clock.

8. The actuator of claim 7, wherein the driving coil and the sensing coil are formed by providing a conductive pattern to a substrate comprising layers.

9. The actuator of claim 8, wherein the driving coil and the sensing coil are formed in different regions in a direction that the layers are stacked.

10. The actuator of claim 8, wherein the driving coil and the sensing coil are formed in a same region in a direction that the layers are stacked.

11. The actuator of claim 10, wherein the driving coil is formed in a portion of the layers, and the sensing coil is formed in another portion of the layers.

12. The actuator of claim 11, wherein one of the layers, having the sensing coil formed therein, is disposed between layers each having the driving coil formed therein.

13. The actuator of claim 7, wherein the sensing coil has at least one of circular shape, triangular shape, and quadrangular shape.

14. The actuator of claim 7, wherein the position calculation processor calculates the position of the magnet, excluding changes in the inductance levels having same increasing or decreasing directions of inductance levels.

15. An actuator, comprising:
a magnet disposed on a side of a lens holder of a lens module;
a driving coil disposed on a substrate, facing the magnet, to move the lens module in an optical axis direction; and
a position calculation processor comprising sensing coils positioned on the substrate facing the magnet, wherein a change in magnitude of a magnetic field generated by the magnet varies an inductance of the sensing coils to determine a displacement of the lens module, and
wherein the position calculation processor calculates the position of the magnet, according to frequencies of oscillation signals generated by counting the frequencies of the oscillation signals using a reference clock, based on inductance levels of the inductance that excludes a subset of the inductance levels having same increasing or decreasing directions of inductance levels.

16. The actuator of claim 15, wherein the sensing coils comprises two sensing coils disposed in the optical axis direction.

17. The actuator of claim 15, wherein the sensing coils comprises two sensing coils disposed in a direction perpendicular to the optical axis direction.

18. The actuator of claim 15, wherein the sensing coils comprises two sensing coils, in which an inductance level of one of the two sensing coils decreases and an inductance level of the other of the two sensing coils increases.

19. An actuator, comprising:
a magnet disposed on a side of a lens holder of a lens module;
a driving coil disposed on a substrate, facing the magnet, to move the lens module in an optical axis direction; and
a position calculation processor comprising sensing coils, positioned opposite to each other, on the substrate and opposite to the magnet, and configured to calculate frequencies of oscillation signals generated based on changes in inductance levels of the sensing coils by counting the frequencies of the oscillation signals using a reference clock,
wherein a change in a position of the magnet changes a resonance frequency of the sensing coils to determine a displacement of the lens module.

20. The actuator of claim 19, wherein the position calculation processor comprises:
an oscillation processor comprising the sensing coils, a capacitor, and a resistor, wherein the oscillation processor is configured to generate oscillation signals to determine the resonance frequency thereof based on the inductance levels of the sensing coils,
an arithmetic processor configured to calculate the resonance frequency of the oscillation signals, and
a determination processor configured to determine the position of the magnet based on the resonance frequency of the oscillating signal.

21. The actuator of claim 20, wherein a magnetic body having high magnetic permeability and a paint formed of a magnetic material are formed between the magnet and the oscillation processor to raise a rate of change in the inductance of the one of the sensing coils based on a change in the position of the magnet.

22. The actuator of claim 19, wherein the position calculation processor calculates the position of the magnet according to frequencies of the oscillation signals generated on the basis of changes in inductance levels of the sensing coils.

23. The actuator of claim 19, wherein the sensing coils have different shapes from each other, where the shapes include a circular shape, a triangular shape, and a quadrangular shape.

* * * * *